(12) United States Patent
Suel, II et al.

(10) Patent No.: US 8,866,423 B2
(45) Date of Patent: Oct. 21, 2014

(54) PMSM FIELD WEAKENING FOR APPLIANCE MOTORS

(75) Inventors: Richard D. Suel, II, Louisville, KY (US); Abhijeet A. Bhandwale, Louisville, KY (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 13/590,704

(22) Filed: Aug. 21, 2012

(65) Prior Publication Data

US 2014/0055065 A1 Feb. 27, 2014

(51) Int. Cl.
*H02P 6/08* (2006.01)

(52) U.S. Cl.
USPC ..................... 318/400.14; 318/163

(58) Field of Classification Search
USPC ................ 318/700, 400.01, 400.02, 400.07, 318/400.14, 400.15, 400.17, 400.12, 162, 318/163, 164
See application file for complete search history.

(56) References Cited

U.S. PATENT DOCUMENTS

| | | | |
|---|---|---|---|
| 4,019,105 A * | 4/1977 | Cornell et al. ................ 318/803 |
| 4,701,839 A * | 10/1987 | McNally et al. ................ 700/61 |
| 5,739,664 A | 4/1998 | Deng et al. |
| 5,825,112 A * | 10/1998 | Lipo et al. ..................... 310/181 |
| 6,034,458 A * | 3/2000 | Uetake et al. ............ 310/156.49 |
| 6,373,211 B1 * | 4/2002 | Henry et al. .................. 318/432 |
| 6,407,531 B1 | 6/2002 | Walters et al. |
| 6,605,912 B1 * | 8/2003 | Bharadwaj et al. ...... 318/400.09 |
| 6,965,212 B1 | 11/2005 | Wang et al. |
| 7,710,066 B2 | 5/2010 | Hashimoto et al. |
| 7,714,529 B2 | 5/2010 | Chen et al. |
| 7,821,217 B2 * | 10/2010 | Abolhassani et al. ........ 318/432 |
| 2005/0160771 A1 * | 7/2005 | Hosoito et al. .............. 68/12.16 |
| 2007/0267990 A1 * | 11/2007 | Abolhassani et al. ........ 318/432 |

OTHER PUBLICATIONS

Microchip AN885, Brushless DC (BLDC) Motor Fundamentals, 2003 Microchip Technology Inc., 2 pages.
Microchip AN1017, Sinusoidal Control of PMSM Motors with dsPIC3OF DSC, 2005 Microchip Technology Inc., 18 pages.
K.N. Leonard et al., Implementing a Sensorless Brushless DC Motor Phase Advance Actuator Based on the TMS320C50 DSP, ESIEE, Paris, Sep. 1996, 29 pages.

* cited by examiner

*Primary Examiner* — Bentsu Ro
(74) *Attorney, Agent, or Firm* — Dority & Manning, P.A.

(57) ABSTRACT

An electric motor in an appliance and a method of controlling the motor to achieve speeds greater than a base speed of the motor is provided. To achieve speeds above the base speed of the motor, field weakening can be implemented by applying a field weakening angle to a phase advance angle between a desired stator flux and a rotor flux. The field weakening angle can be based on the current speed of the motor. The field weakening angle can be a fixed angle and can be determined by comparing the current speed of the motor with a predetermined threshold. In addition, the magnitude of the electrical signal applied to the motor can be adjusted during field weakening based on a desired speed of the motor where the electrical signal can be a voltage.

16 Claims, 10 Drawing Sheets

PMSM FIELD WEAKENING FOR APPLIANCE MOTORS

FIELD OF THE INVENTION

The present disclosure relates to an electric motor, and more particularly to a system and method of controlling a permanent magnet synchronous machine (PMSM) motor.

BACKGROUND OF THE INVENTION

Motors are used in various appliances to convert electrical power into mechanical energy to produce actuation about an axis. For example, in a washing machine a motor can be coupled with a washing tub such that the tub rotates at various speeds. In an air conditioner, a motor can be coupled with a fan to circulate air. In a refrigerator, a motor can be coupled with a compressor to supply cool air into a fresh food and/or freezer compartment.

A permanent magnet synchronous machine (PMSM) motor can include a rotor having a permanent magnet and a stator having a plurality of electromagnetic poles such that the rotor rotates about an axis by locking into the rotating magnetic fields generated on the stator. In a PMSM motor, base speed is the maximum speed the motor can reach without modifying the magnetic field between a rotor and stator of the motor. If speeds above the base speed are desired, the motor can be controlled using field weakening techniques. Field weakening can reduce the magnitude of the magnetic field (magnetic flux) between the rotor and the stator, thereby reducing torque and increasing the speed of the motor above the base speed without causing damage to the motor.

Traditionally, field orientated control (vector control) can be used to control a motor. In vector control systems, the voltage applied to the stator poles is adjusted to achieve the desired speed. When a speed greater than the base speed is desired, field weakening is achieved by modifying a voltage to have a constant maximum magnitude and calculating the phase angle using a micro-processor. However, the implementation of this technique is inefficient due to limited memory space in the micro-processor and a reduction in computational speed. In addition, calculation of the phase angle includes significant calculations such as detecting the current in AC, transforming the AC current signal into a DC signal, independently controlling a real and imaginary component of the DC signal to modify the voltage, and transforming the DC signal back into an AC signal. This calculation requires significant micro-processor resources and leads to complexity of the system.

Thus, a need exists for an improved field weakening control technique of a PMSM motor that can achieve field weakening using reduced computational power to achieve a desired speed.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a motor drive system. The motor drive system can include a motor having a rotor and a stator and an inverter coupled to the motor. The inverter can be configured to apply a power signal to drive the motor. The motor drive system can also include a controller coupled to the inverter. The controller can be configured to operate the motor above a base speed using a field weakening technique. The field weakening technique can comprise applying a field weakening phase-advance angle to the power signal relative to a rotor flux position and adjusting an amplitude of the power signal based on a desired speed. The field weakening phase-advance angle can be determined based on a current speed of the motor.

Another exemplary aspect of the present disclosure is directed to a method of controlling a motor using a field weakening technique. The method can include determining a field weakening phase advance angle of a power signal based on a current motor speed; applying the field weakening phase advance angle to the power signal to the motor relative to a rotor flux position using an inverter; and adjusting an amplitude of the power signal based on a desired speed of the motor.

Yet another exemplary aspect of the present disclosure is directed to an appliance. The appliance can include a motor having a rotor and a stator and an inverter coupled to the motor. The inverter can be configured to apply a power signal to drive the motor. The appliance can also include a controller coupled to the inverter. The controller can be configured to operate the motor above a base speed using a field weakening technique. The field weakening technique can comprise applying a field weakening phase-advance angle to the power signal relative to a rotor flux position and adjusting an amplitude of the power signal based on a desired speed. The field weakening phase-advance angle can be determined based on a current speed of the motor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
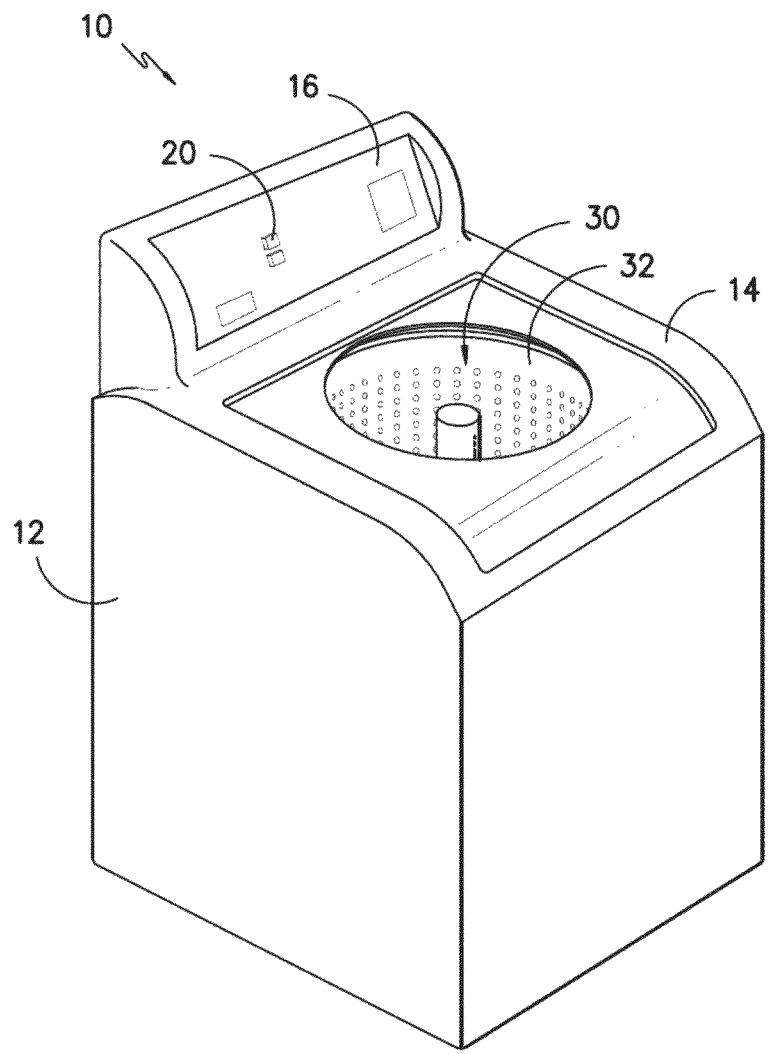
FIG. 1 depicts an exemplary washing machine appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure relates to an electric motor in an appliance and a method of controlling the motor to achieve speeds greater than a base speed of the motor. The base speed of the motor is the maximum speed the motor can reach without modifying the magnetic field between a rotor and stator of the motor. To achieve speeds above the base speed of the motor, field weakening can be implemented by applying a field weakening angle to a phase advance angle between a desired stator flux and a rotor flux. The field weakening angle can be based on the current speed of the motor. The field weakening angle can be a fixed angle and can be determined by comparing the current speed of the motor with a predetermined threshold. In addition, the magnitude of the electrical signal applied to the motor can be adjusted during field weakening based on a desired speed of the motor where the electrical signal can be a voltage.

FIG. 1 depicts an exemplary washing machine appliance according to an exemplary embodiment of the present disclosure. While the present disclosure will be discussed with reference to a washing machine, the systems and methods according to embodiments of the present disclosure are not limited to use with washing machines and can be used with any other appliance having an electric motor such as air conditioners, refrigerators, etc.

FIG. 1 illustrates a washing machine 10 including a cabinet 12 having a control panel or user interface 16 that extends from cover 14. User interface 16 includes a variety of appliance control input selectors 20 that can be for operator selection and display of washing cycles, features, machine status, and any other information of interest to users.

The user interface 16 can have various configurations, and controls can be mounted in other configurations and locations other than as shown in FIG. 1. One or more of a variety of electrical, mechanical, or electro-mechanical input devices including rotary dials, push buttons, and touch pads can also be used singularly or in combination with other types of input devices such as a touch screen or liquid crystal display. The user interface 16 can include a display component, such as a digital or analog display device designed to provide operational feedback to a user.

Figure 2:
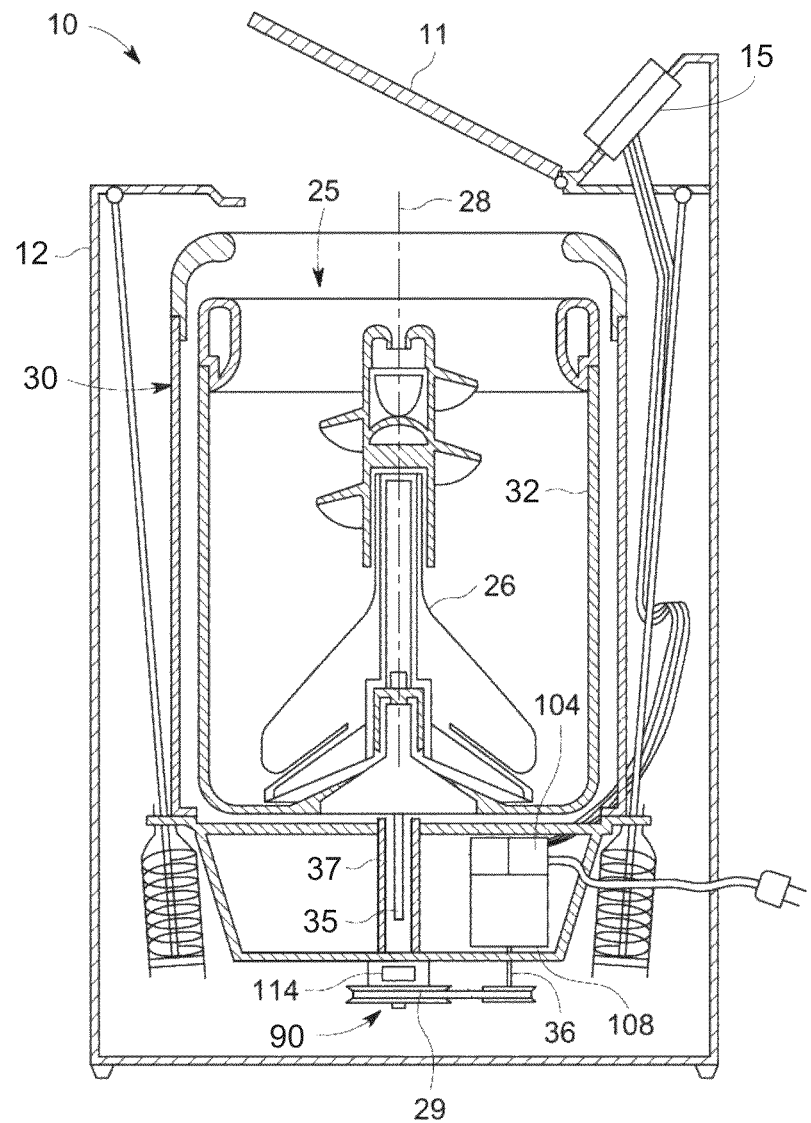
FIG. 2 depicts a cross-sectional view of an exemplary washing machine appliance according to an exemplary embodiment of the present disclosure.

FIG. 2 depicts a cross-sectional view of an exemplary washing machine appliance according to an exemplary embodiment of the present disclosure. As illustrated in FIG. 2, wash chamber 30 may be located within cabinet 12, and a wash basket or tub 32 may be rotatably mounted within wash chamber 30 in a spaced apart relationship from wash chamber 30 about vertical axis 28. Basket 32 can include a plurality of perforations therein to facilitate fluid communication between the interior of basket 32 and wash tub 30. Articles to be washed can be loaded into basket 32 through door 11 and opening 25. An agitator, impeller, or oscillatory basket mechanism 26 can be disposed in basket 32 to impart an oscillatory motion to articles and liquid in basket 32. Wash chamber 30 can also be in fluid communication with one or more pumps and/or drains (not shown) for the removal of water, such as grey water, from chamber 30 such as e.g., after a wash or rinse cycle.

Washing machine 10 can be controlled by a processing device or other controller 15, such as a microprocessor, according to user preference via manipulation of control input selectors 20 that can be mounted in user interface 16. Controller 15 and motor controller 104 can include a memory and microprocessor, CPU or the like, such as a general or special purpose microprocessor operable to execute programming instructions or micro-control code associated with washing machine control. The memory can represent random access memory such as DRAM, or read only memory such as ROM or FLASH. In one embodiment, the processor executes programming instructions stored in memory. The memory can be a separate component from the processor or can be included onboard within the processor. Alternatively controller 15 and motor controller 108 can be a single device. The controller 15 and motor controller 108 can be programmed to operate washing machine 10 according to the exemplary aspects of the present invention as set forth below.

As illustrated in FIGS. 1 and 2, agitator 26 can be oriented to rotate about a vertical axis 28. However, the wash basket 32 can be oriented to rotate around any axis, such as the vertical axis, horizontal axis or a varying degree axis.

Motor 108 can provide for the movement of agitator 34 via drive arrangement 90. Drive arrangement 90 can include a pulley mounted to a motor driveshaft 36 connected by belt 29 to a pulley mechanically coupled to basket driveshaft 35 and spin tube 37, which can be concentric shafts. Driveshaft 36 can be directly coupled to the pulley and belt 29 that drives the agitator 26. Alternatively, washing machine 10 can include any type of driving means such as a direct drive type having no belt or pulley. Spin tube 37 can be directly coupled to the basket 32 or it can be integral with the basket 32.

A clutch (not shown) can lock the basket driveshaft 35 and spin tube 37 when motor 108 is energized. Speed sensor 114 can be provided on motor driveshaft 36 and can be coupled with controller 15 and/or motor controller 104. While illustrated below the basket driveshaft 35, speed sensor 114 can be located in various locations in cabinet 12 and can be used to measure the speed of various components such as the basket driveshaft 35, motor driveshaft 36 and/or basket 32. A plurality of speed sensors 114 can also be used.

Figure 3:
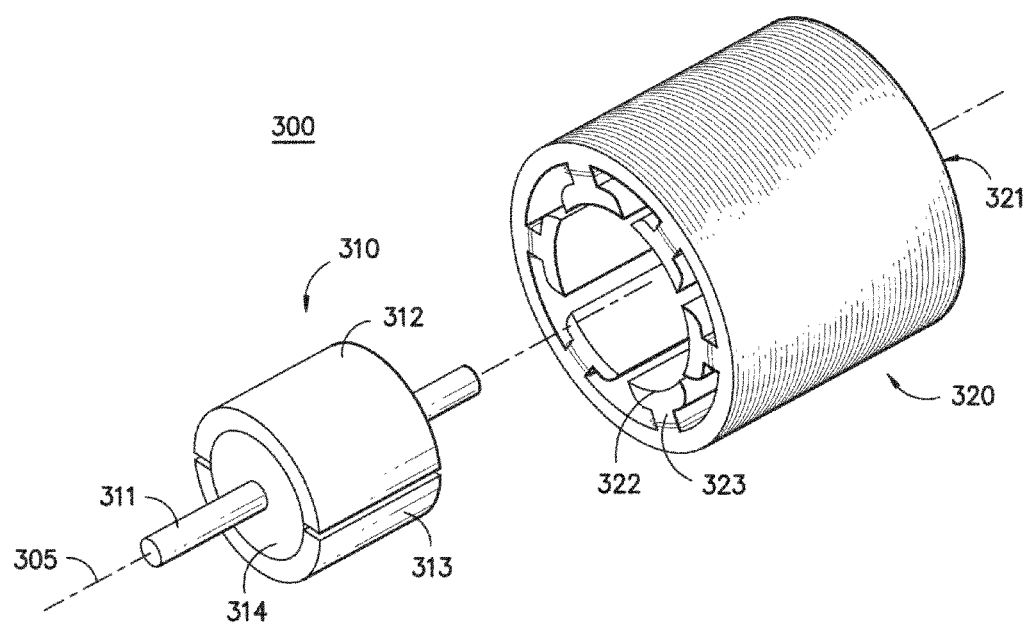
FIG. 3 depicts an exploded view of exemplary motor according to an exemplary embodiment of the present disclosure.
Figure 4:
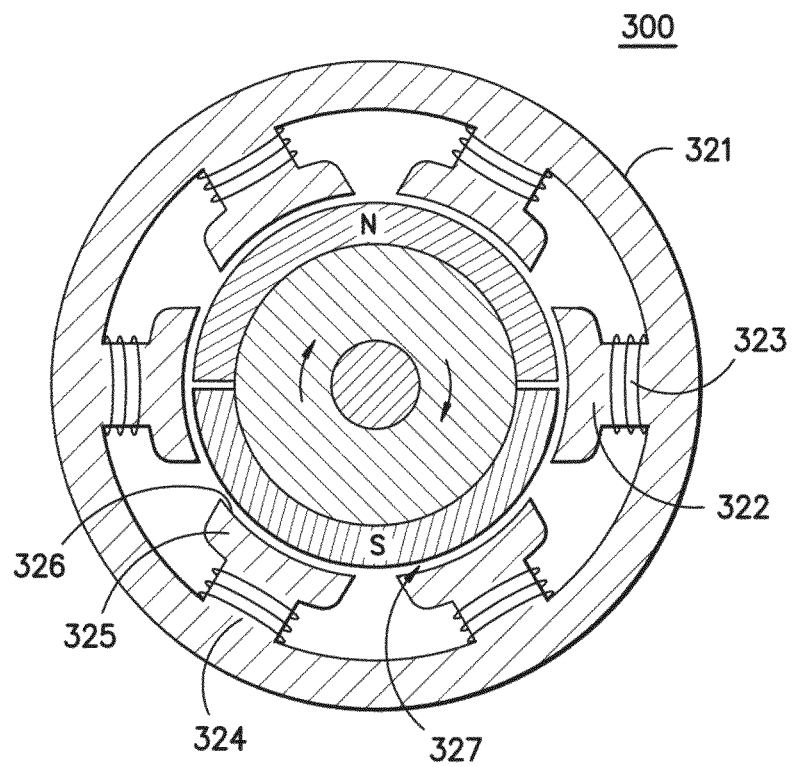
FIG. 4 depicts a cross-sectional view of an exemplary motor according to an exemplary embodiment of the present disclosure.

FIGS. 3 and 4 illustrate an exemplary motor 300 according to an exemplary embodiment of the present disclosure. Specifically, FIG. 3 depicts an exploded view of the motor 300 and FIG. 4 depicts a cross-sectional view of the motor 300.

As illustrated in FIG. 3, motor 300 includes a rotor 310 and a stator 320. For purposes of illustration the rotor 310 and stator 320 are provided separately. However, the stator 320 actually surrounds the rotor 310 such that when they rotate about axis 305 a magnetic flux is generated in an air gap between the two elements.

The motor illustrated in FIG. 3 can be a permanent magnet synchronous machine (PMSM) motor having a rotor 310 and a stator 320. While the motor can be configured as shown, it can also have an alternative "inside out" configuration such that the rotor 310 surrounds the stator 320.

Rotor 310 can include a shaft 311 rotatable about axis 305. Permanent magnets 312 and 313 are affixed to a core 314 by any attaching method such as gluing, embedding, retaining, and/or other coupling techniques. In addition, while two permanent magnets are shown, any number of permanent magnets can be included in rotor 310. A rotor magnetic field can be generated by the permanent magnets 312 and 313.

Stator 320 can include a stator core 320 formed in a cylindrical shape having an axis coincident with the rotor central axis 305. The stator core 320 can be a single element or it can include a plurality of individual stator rings stacked and coupled together. A plurality of stator poles 322 can project inwardly from the stator core toward the rotor 310. While six stator poles 322 are illustrated, any number of poles can be formed in the stator core 320. For example, in a three-phase motor, the number of poles can be related to a multiple of three such as twenty seven total stator poles. A winding 323 can be provided around each stator pole 322 to create an electromagnetic field when a power signal is supplied to the winding 323.

FIG. 4 depicts a cross-sectional view of an exemplary motor 300 according to an exemplary embodiment of the present disclosure. FIG. 4 illustrates a cross-section of the rotor 310 located within the stator 320. The stator poles 322 can project inwardly from the stator core 321 toward the external surface of the permanent magnets 312 and 313 of the rotor 310. Each stator pole 322 can include a root portion 324 coupled to the stator core 321 and a head portion 325. While the stator poles 322 are illustrated as having a root portion 324 and a head portion 325, the stator poles 322 can have any shape or configuration. For instance, head portions 325 can include apertures.

Windings 323 can be any type of conductive material and wound around the root portion 324. The head portion 325 can be coupled with the root portion 324. The uppermost surface of the head portion 324 can form a pole face 326. A stator magnetic field can be generated on the pole face 326 when a power signal is supplied to the windings 323.

An air gap 327 can be formed between the rotor 310 and the stator 320. A magnetic field can be formed in the air gap 327 when the motor is energized, where the magnetic field can be influence by the rotor magnetic field and the stator magnetic field.

Figure 5:
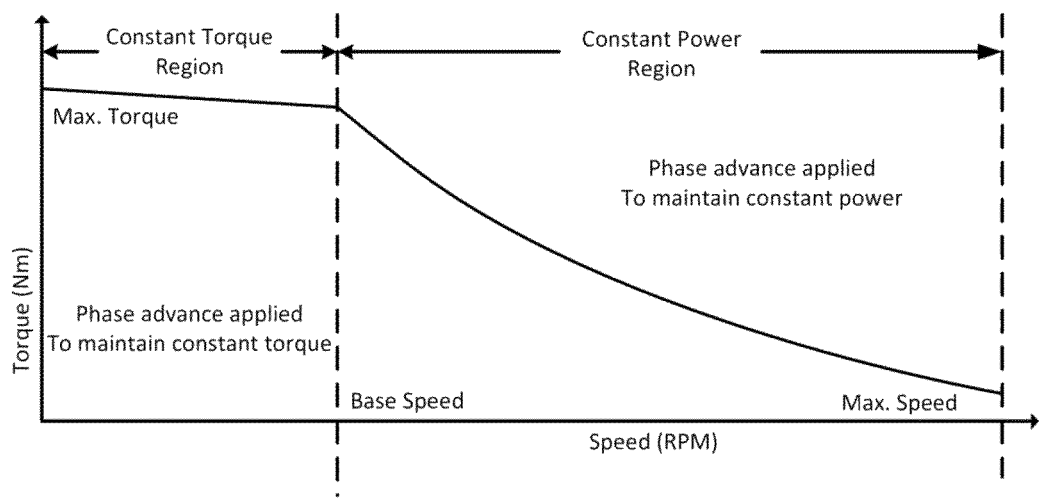
FIG. 5 depicts a graphical representation according to an exemplary embodiment of the present disclosure.

FIG. 5 graphically depicts a torque load of the motor in relation to the speed of the motor. A maximum torque/amp can be maintained below base speeds by maintaining a 90° angle between the stator flux and the rotor flux. To maintain the 90° angle between the rotor flux and the stator flux below base speed, the phase inductance may need to be compensated for depending on the type of control algorithm. For vector control, the inductance is compensated for automatically by the Clarke/Park transformation which is well known, but for voltage control, the phase voltages can be advanced more than 90° ahead of the rotor flux such that the resulting phase current will be exactly 90° ahead of the rotor flux. This slight voltage angle advance beyond 90° is referred to as phase advance.

A base speed of a motor is when the back-EMF generated by the motor approaches the maximum output voltage that can be delivered by the inverter. Below base speed, a maximum torque-per-amp can be delivered by keeping the stator flux 90° ahead of the rotor flux. To increase speed above base speed, the flux vector generated on the stator poles can be advanced beyond 90° ahead of the rotor flux such that there is a vector component that opposes the rotor flux and reduces the net flux across the motor air gap. This reduction in air-gap flux in-turn reduces the back-EMF that is generated by the motor allowing the motor speed to increase until once again the back-EMF voltage approaches the max inverter output voltage. The stator flux is advanced again and again until the desired speed is achieved. As illustrated in FIG. 5, tradeoff of field-weakening is that the maximum torque is reduced more and more as the phase angle is increased further and further.

Figure 6:
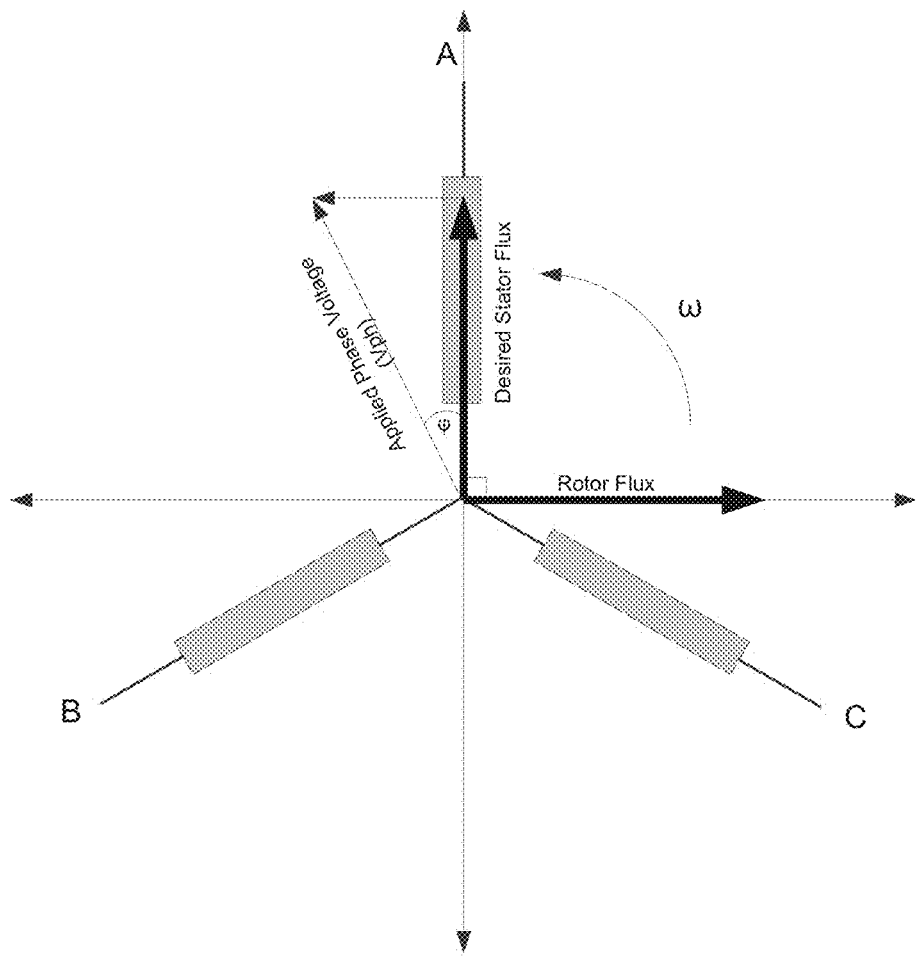
FIG. 6 depicts a graphical representation of vectors associated with normal operational control of a motor according to an embodiment of the present disclosure.

FIG. 6 depicts a rotor flux vector and a stator flux vector under normal operating conditions below base speed according to an exemplary embodiment of the present disclosure. The plurality of axis A, B, C, represents an axis for three pairs of stator poles; however, the motor can include any number of stator pole pairs. The stator flux can be proportional to a torque producing current and the rotor flux can be proportional to a field producing current.

As previously discussed, to maximize torque produced by a motor the magnetic field between the rotor (Rotor Flux) and the stator magnetic field (Desired Stator Flux) can be 90°. The motor can rotate at an angular velocity ($\omega$) which can be the rate of change of the magnetic field between the rotor and the stator. To achieve a 90° angle, the phase advance angle ($\phi$) and applied phase voltage (Vph) can be applied as illustrated. While the vectors are only illustrated for one stator pole pair, the phase advance angle ($\phi$) and applied phase voltage (Vph) can be applied similarly to each pair.

Figure 7:
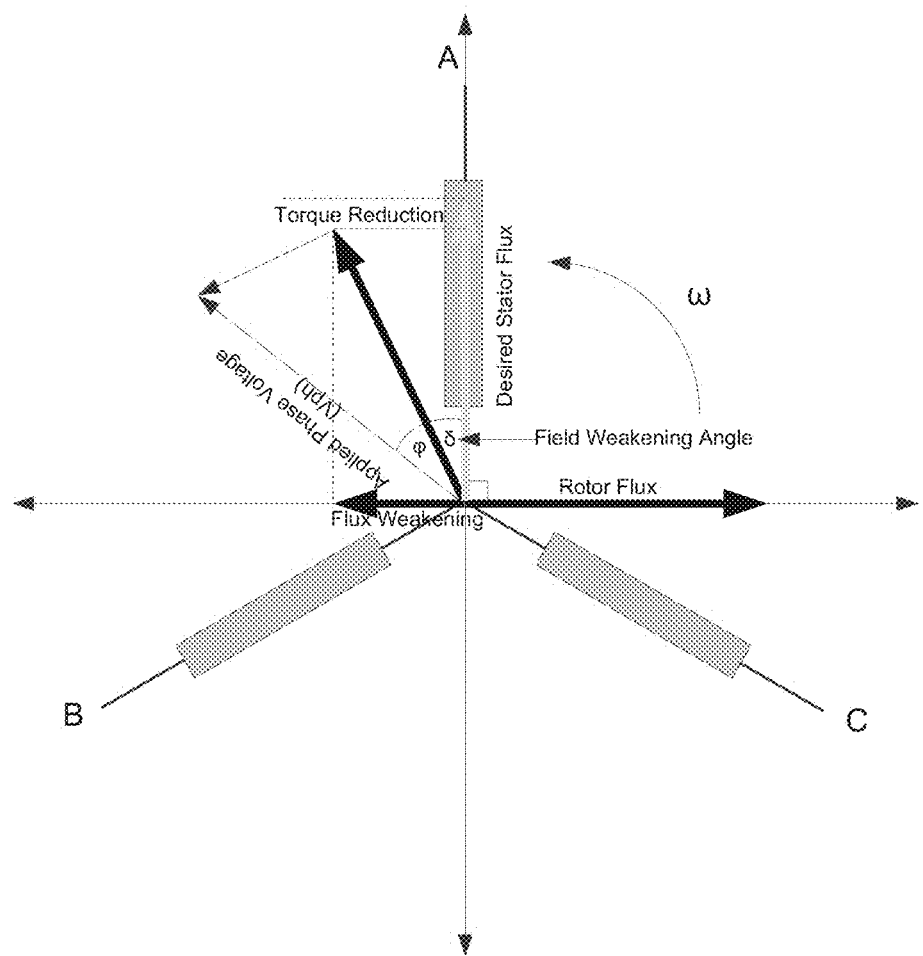
FIG. 7 depicts a graphical representation of vectors associated with operational control of a motor applying a fixed phase-advance according to an embodiment of the present disclosure.

FIG. 7 depicts a rotor flux vector and a stator flux vector under field weakening conditions according to an exemplary embodiment of the present disclosure. When the field weakening angle ($\delta$) is applied in addition to the phase advance angle ($\phi$), field weakening of the flux across the air-gap occurs due to an opposing flux weakening vector. When the rotor flux is weakened, the speed of the motor can be increased above the base speed. In addition, the torque output of the motor is also reduced.

Figure 8:
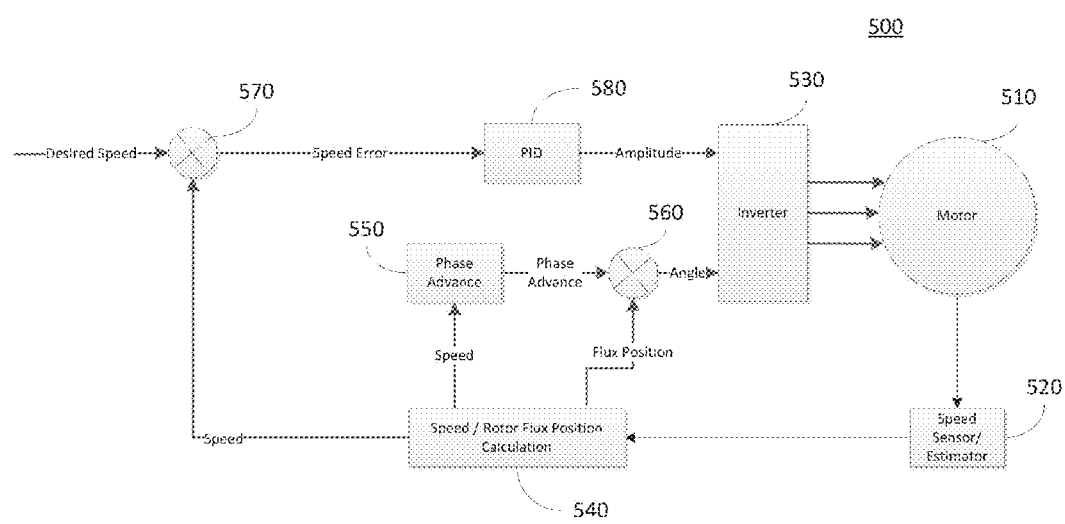
FIG. 8 depicts a control topology for a motor system according to an exemplary embodiment of the present disclosure.

FIG. 8 depicts a control topology for a motor system 500 according to an exemplary embodiment of the present disclosure. The illustrated control topology can be configured within a single controller or can be multiple controllers. Any/all of the "controllers" discussed in this disclosure can include a memory and one or more processing devices such as microprocessors, CPUs or the like, such as general or special purpose microprocessors operable to execute programming instructions or micro-control code associated with operation of a motor. The memory can represent random access memory such as DRAM, or read only memory such as ROM or FLASH. In one embodiment, the processor executes programming instructions stored in memory. The memory can be a separate component from the processor or can be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform control functionality instead of relying upon software.

As illustrated, the motor control system 500 can include a PMSM motor 510, a speed sensor/estimator 520, an inverter 530, and various control typology elements. As the motor 510 is driven, a feedback signal is provided to a speed sensor or speed estimator 520. When a speed sensor is employed, sensor 520 can be any type of speed sensor that can detect speed and/or rotor flux position. For instance, speed sensor 520 can be a plurality of Hall sensors, for example three sensors, where each sensor is offset from the others by 120 degrees so that each sensor output is in alignment with the phase-to neutral BEMF of each phase. Alternatively, when a speed estimator is not included in the motor control system 500 the speed and/or rotor flux of the motor 510 can be determined without a sensor. For instance, the speed and/or rotor flux can be calculated based on an electrical signal and/or a model of the motor executed in the controller.

Using the feedback from the speed sensor/estimator 520, a speed/rotor flux position calculation 540 can be determined. The current speed is provided to a predetermined phase advance angle determination element 550. The predetermined phase advance angle determination element 550 can be a lookup table where the current speed corresponds to a predetermined or fixed phase advance angle. The rotor flux position and the predetermined phase advance angle along with a 90° offset can be summed at 560. The final angle for the power signals to the motor, for instance, voltage, is provided to inverter 530.

In addition, the current speed determined at the speed/rotor flux position calculator 540 is compared to a desired speed at 570. The difference between the current speed and the desired speed can be considered the speed error and provided to a proportional-integral-derivative (PID) controller 580. A PID controller can determine a voltage amplitude based on the speed error and the amplitude is provided to the inverter 530.

Inverter 530 can supply an electrical signal to motor 510 to energize the stator and induce rotation of the motor based on the determined amplitude and phase angle. The electrical signal can be a multi-phase signal proportional to the number of stator poles. Pulse width modulation can be implemented to provide the electrical signal to the motor. The electrical signal can be a voltage.

Inverter 530 can have any configuration that converts an input signal into a variable frequency and amplitude alternating current (AC) signal. For instance, the inverter 520 can include switching elements, diodes, capacitors, control circuitry and/or or any other switching devices.

The motor control system 500 can regulate the electrical signal supplied to the motor 510 under normal operating conditions and field weakening conditions. For instance, under normal operation conditions the amplitude of the voltage can be adjusted to regulate speed under the base speed and the phase advance angle can be determined using the equation:

$$\phi = \tan^{-1} \frac{j\omega * Lph * Iph}{Vemf + Iph * Rph}$$

Alternatively, the phase advance angle can be determined using a lookup table that implements a transfer function. Above base speed, an additional field-weakening angle can be applied to the phase advance angle to achieve an output power for a desired speed. The field weakening angle can increase linearly with speed. During field weakening, the phase advance angle and the field weakening angle are held constant and the amplitude of the voltage can be regulated to achieve the desired speed and remain fixed at the current speed. A new field weakening phase-advance angle can be determined when a new speed is detected.

Figure 9:
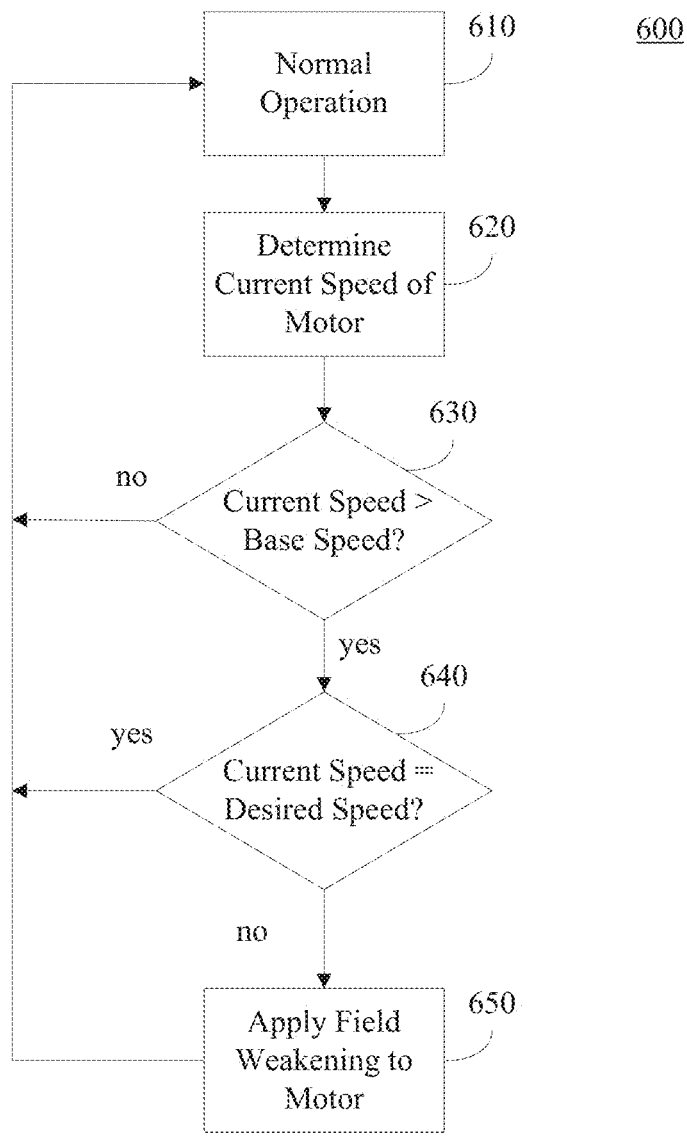
FIG. 9 depicts a flow chart of an exemplary method of controlling a motor according to an exemplary embodiment of the present disclosure.
Figure 10:
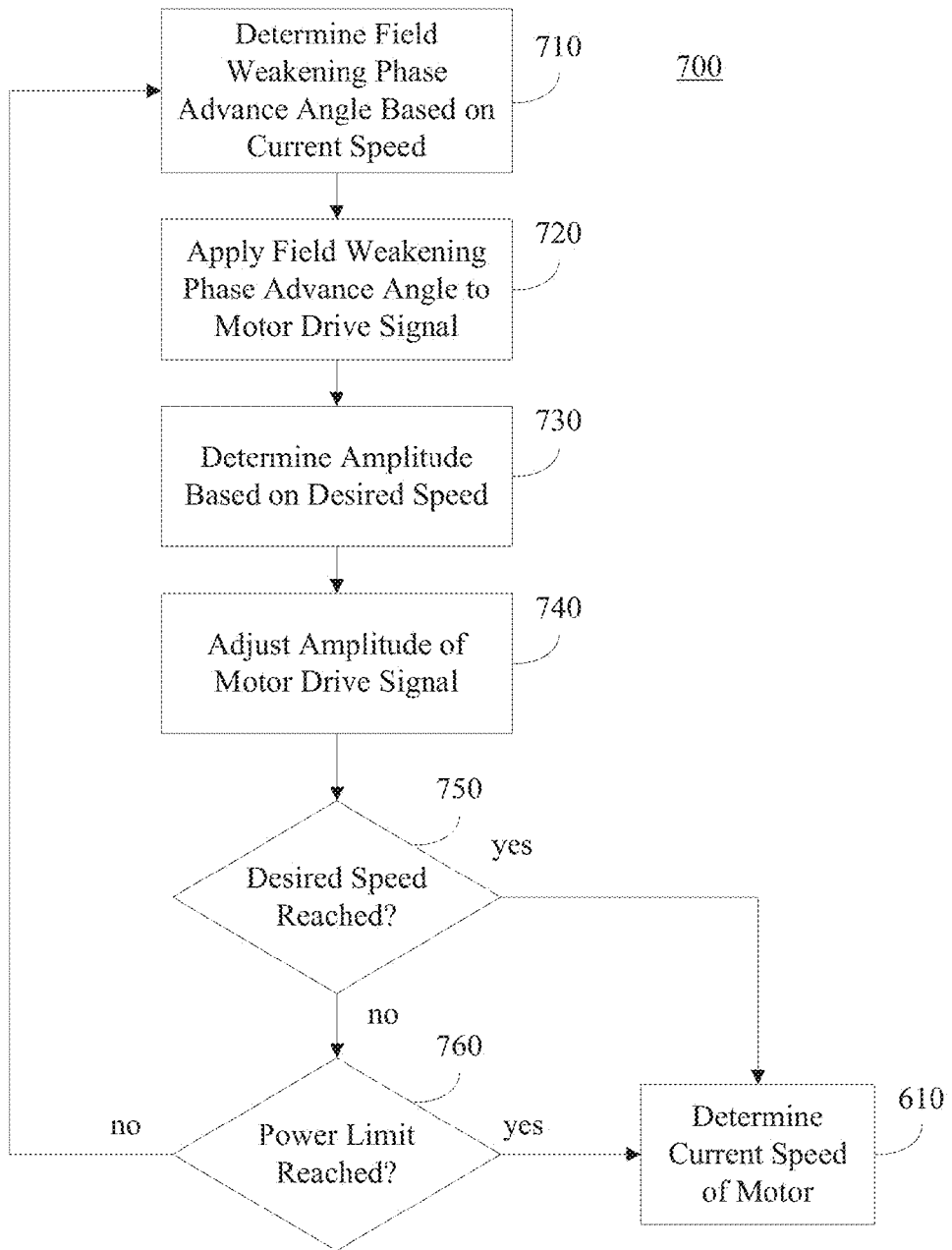
FIG. 10 depicts a flow chart of an exemplary method of controlling a motor according to an exemplary embodiment of the present disclosure.

FIGS. 9 and 10 illustrate flow charts of exemplary methods 600 and 700 according to an exemplary embodiment of the present disclosure. The methods 600 and 700 can be implemented with any suitable electric motor system. In addition, although FIGS. 9 and 10 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

FIG. 9 depicts a flow chart of exemplary method 600 of controlling a motor according to an exemplary embodiment of the present disclosure. Normal operation can begin at (610) where normal operation can be the operation of the motor below the base speed. The current speed of the motor can be determined at (620). The speed can be determined using a sensor to detect the speed of the motor or a feedback signal that can be used to determine the current speed of the motor. The current speed can be compared to the base speed of the motor at (630). When the current speed is greater than the base speed and it is determined that the current speed has not reached the desired speed at (640), a field weakening technique can be applied to the motor at (650). Otherwise, normal operation can resume at (610).

FIG. 10 depicts a flow chart of an exemplary field weakening technique 700 according to an exemplary embodiment of the present disclosure. A field weakening phase advance angle can be determined based on the current speed at (710). The field weakening phase advance angle can be a predetermined fixed phase advance angle based on the current speed. The phase advance angle can be determined by a lookup table, an algorithm, an equation, and/or a model. At (720) the field weakening phase advance angle can be applied to the signal used to drive the motor.

An amplitude of the motor drive signal can be determined based on the desired speed of the motor at (730). For instance, the current speed of the motor can be compared with a desired speed of the motor to determine a speed error value. The amplitude of the motor drive signal can be adjusted and applied to the motor at (740) based on the speed error value. The speed of the motor can be detected and it can be determined whether the desired speed has been reached at (750). If the desired speed has not been reached, it can be determined whether the power limit of the inverter has been reached at (760). When the power limit and/or the desired speed have been reached, the current speed of the motor can be detected at 610 and the control method illustrated in FIG. 10 can proceed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A motor drive system, comprising:
a motor having a rotor and a stator;
an inverter coupled to the motor, the inverter configured to apply a power signal to drive the motor; and
a controller coupled to the inverter, the controller configured to operate the motor above a base speed using a field weakening technique;
wherein the field weakening technique comprises applying a fixed field weakening phase-advance angle to the power signal relative to a rotor flux position and increasing a voltage of the power signal until a desired speed is achieved.

2. The motor drive system as in claim 1, wherein the fixed field weakening phase-advance angle includes a fixed field weakening angle and a phase-advance angle.

3. The motor drive system as in claim 1, further comprising a sensor to detect at least one of the current speed of the motor and the rotor flux position.

4. The motor drive system as in claim 1, wherein the current speed of the motor and the desired speed of the motor are compared to determine a speed error of the motor.

5. The motor drive system as in claim 4, wherein the voltage of the power signal is adjusted based on the speed error.

6. The motor drive system as in claim 1, wherein the motor is a permanent magnet synchronous motor.

7. A method of controlling a motor using a field weakening technique, comprising:
   determining a fixed field weakening phase advance angle of a power signal based on a current motor speed;
   applying the fixed field weakening phase advance angle to the power signal to the motor relative to a rotor flux position using an inverter; and
   increasing a voltage of the power signal until a desired speed of the motor is achieved.

8. The method as in claim 7, wherein the fixed field weakening phase-advance angle includes a fixed field weakening angle and a phase-advance angle.

9. The method of claim 7, wherein the fixed field weakening phase advance angle is determined when the desired speed is above a base speed of the motor.

10. The method of claim 7, further comprising detecting the current motor speed using a speed sensor.

11. The method of claim 7, further comprising determining a speed error of the motor based on the current speed and the desired speed.

12. The method of claim 11, wherein the voltage of the power signal is adjusted based on the speed error.

13. The method of claim 7, wherein the motor is a permanent magnet synchronous motor.

14. A method for operating a motor using a field weakening technique, the method comprising:
   determining a current speed of the motor;
   determining whether the current speed of the motor exceeds a base speed;
   determining whether the current speed of the motor equals a desired speed;
   when the current speed of the motor exceeds the base speed but does not equal the desired speed, performing the field weakening technique, the field weakening technique comprising:
      determining a field weakening angle based on the current speed of the motor;
      applying the field weakening angle to a motor drive signal used to drive the motor; and
      holding the field weakening angle constant and increasing a magnitude of a voltage of the motor drive signal until the current speed of the motor equals the desired speed or a power limit is reached.

15. The method of claim 14, wherein determining the field weakening angle based on the current speed of the motor comprises consulting a lookup table to retrieve the field weakening angle based on the current speed of the motor.

16. The method of claim 14, wherein the field weakening technique further comprises:
   when the power limit is reached, determining a new field weakening angle based on the current speed of the motor.

* * * * *